United States Patent
Ozbutun et al.

[19]

[11] Patent Number: 5,819,256

[45] Date of Patent: Oct. 6, 1998

[54] METHOD AND APPARATUS FOR PROCESSING COUNT STATEMENTS IN A DATABASE SYSTEM

[75] Inventors: Cetin Ozbutun, San Carlos; Michael Depledge, San Jose; Hakan Jakobsson, San Francisco; Jeffrey I. Cohen, Mountain View, all of Calif.

[73] Assignee: Oracle Corporation, Redwood Shores, Calif.

[21] Appl. No.: 752,128

[22] Filed: Nov. 20, 1996

[51] Int. Cl.⁶ .................................................. G06F 17/30
[52] U.S. Cl. ............................................................ 707/2
[58] Field of Search .................................................. 707/2

[56] References Cited

U.S. PATENT DOCUMENTS

| | | | |
|---|---|---|---|
| 5,379,419 | 1/1995 | Hefferman et al. | 707/4 |
| 5,412,804 | 5/1995 | Krishna | 707/2 |
| 5,542,078 | 7/1996 | Martel et al. | 707/101 |
| 5,561,793 | 10/1996 | Bennett et al. | 707/201 |
| 5,590,324 | 12/1996 | Leung et al. | 707/5 |
| 5,634,019 | 5/1997 | Koppolu et al. | 345/335 |

*Primary Examiner*—Wayne Amsbury
*Attorney, Agent, or Firm*—McDermott, Will & Emery

[57] ABSTRACT

A method and apparatus for processing count queries in a database system is provided. The database server determines whether it is possible for the target data specified in a count query to contain null values. If the target data cannot contain null values, the count query is converted into a count star query. Count star queries are executed by counting the number of records that store the target data without actually reading and evaluating the target data. If an index for the table that stores the target data exists, then the number of records are counted without accessing the table itself by counting record identifiers in the index. If the index is a bitmap index, the number of bits that are set in bitmaps from the index are counted without actually generating record identifiers from the bitmaps. Many processes are used to generate intermediate count values from the bitmaps. The intermediate count values are summed to produce a total count value. For count queries that contain group by clauses, intermediate count values are generated for each distinct key value. The intermediate count values are summed to produce a total count value for each distinct key value.

20 Claims, 4 Drawing Sheets

METHOD AND APPARATUS FOR PROCESSING COUNT STATEMENTS IN A DATABASE SYSTEM

FIELD OF THE INVENTION

The present invention relates to database systems, and more specifically, to performing COUNT functions in a database system.

BACKGROUND OF THE INVENTION

Relational databases store information in indexed tables. A user retrieves information from the tables by entering input that is converted to queries by a database application. The database application submits the queries to a database server. In response to a query, the database server accesses the tables specified in the query to determine which information within the tables satisfies the queries. The information that satisfies the queries is then retrieved by the database server and transmitted to the database application.

For any given database server, the queries must conform to the rules of a particular query language. Most query languages provide users a variety of ways to specify information to be retrieved. One popular query language is know as the Structured Query Language (SQL).

Tables are comprised of cells, where each cell corresponds to a particular column within a particular row of a table. When a cell does not contain an actual value, a placeholder referred to as a "null value" is stored in the cell. A null values is not the same as arithmetic zero or logical FALSE. A null value simply serves as a flag to indicate that the actual value for the cell is unknown or not meaningful.

Many database servers provide a function for counting the number of non-null values in a specified set of data (the "target data"). The target data may be, for example, a particular column of a particular table. Queries that include statements to invoke this function are referred to herein as count queries. For example, in SQL, the following count query causes the database server to determine the number of employees in a table named "emp" by counting how many non-null values that are in the a column named "empno" of table "emp":

SELECT COUNT(empno) FROM emp;

This query returns a single row that contains the total count of non-null values in the column "empno" of the table "emp". For example, if the empno column contains three non-null values (e.g. 10, 20 and 30) and two null values, then the result of the SELECT query specified above is a count of 3, not 5. Because the "count" function returns a single result row that contains information derived from the values contained in many rows, the count function is referred to as an aggregate function.

Processing a count query may involve a significant amount of overhead. To process a count query, a count value is created and initialized to zero. If the specified target data does not have an index, the database server fetches from the database into dynamic memory every record that contains the target data. For example, if the target data is a particular column of a table, then the database server retrieves every row of the table. The database server then evaluates the value in each record of the target data. If the target data in a particular record is not null, then the count value is incremented. If the target data in a particular record is null, then the count value is not incremented.

Due to the overhead involved in processing count queries, it is clearly desirable to provide a method and apparatus for processing count queries more efficiently. It is further desirable to provide a technique that does not read and evaluate data from every record that contains target data every time a count query is submitted to the database server.

SUMMARY OF THE INVENTION

A method and apparatus for processing count queries in a database system is provided. According to one aspect of the invention, a database server determines whether it is possible for the target data specified in a count query to contain null values. If the target data cannot contain null values, the count query is converted into a count star query.

According to another aspect of the invention, count star queries are executed by counting the number of records that store the target data. This counting operation is performed without actually reading and evaluating the target data. If an index for the table that stores the target data exists, then the number of records are counted without accessing the table itself by counting record identifiers in the index. If the index is a bitmap index, the number of bits that are set in bitmaps from the index are counted without actually generating record identifiers from the bitmaps. In some embodiments, the count may actually be stored in the index along with the bitmap. In such embodiments, the act of "counting" the bits of a bitmap is simply performed by reading a count value associated with the bitmap from the index.

According to another aspect of the invention, many processes are used to generate intermediate count values from the bitmaps. The intermediate count values are summed to produce a total count value. For count queries that contain group by clauses, intermediate count values are generated for each distinct key value. The intermediate count values are summed to produce a total count value for each distinct key value.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for processing count queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
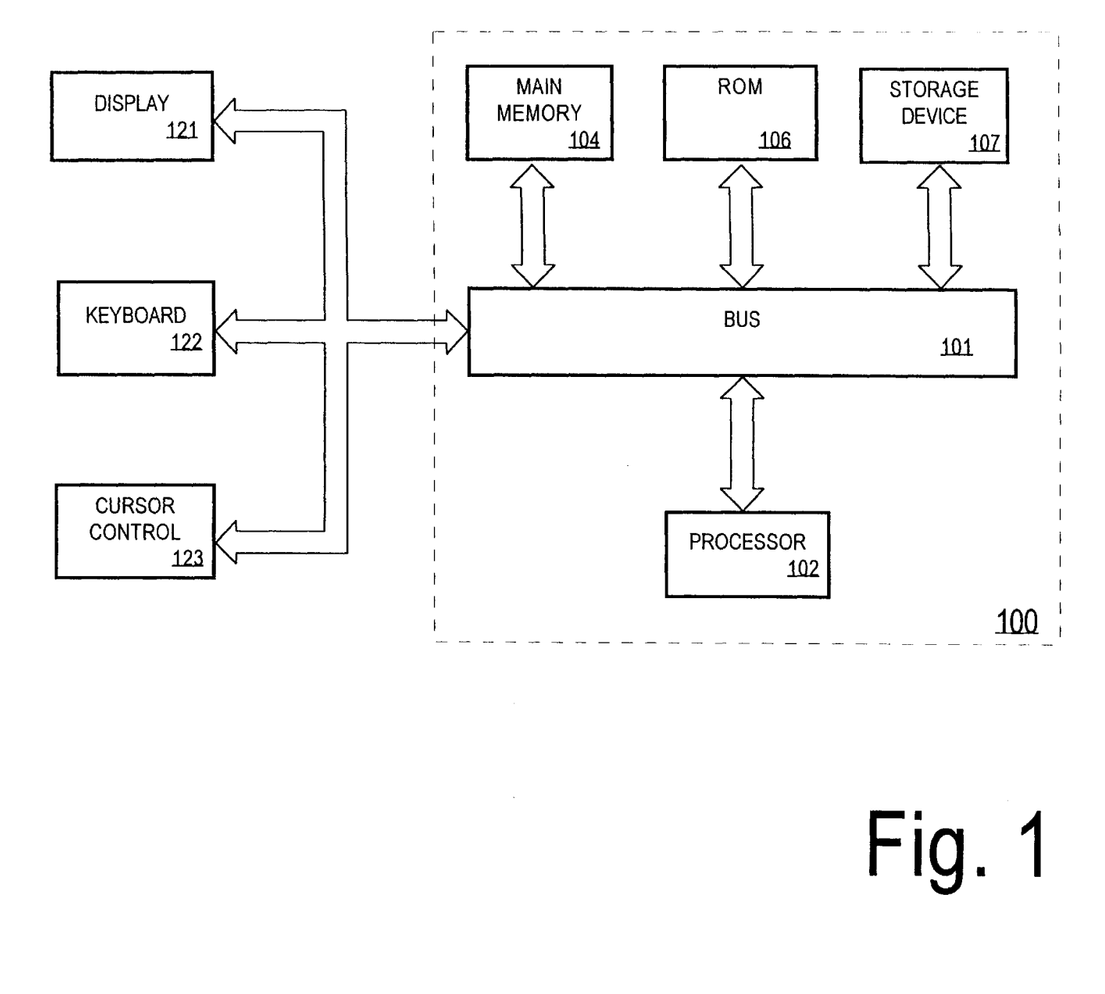
FIG. 1 is a block diagram of a computer system that may be used to implement an embodiment of the invention.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to process count queries. According to one embodiment, count queries are processed by computer system 100 in response to processor 102 executing sequences of instructions contained in memory 104. Such instructions may be read into memory 104 from another computer-readable medium, such as data storage device. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

THE COUNT EXPRESSION

The portion of a count query that specifies the target data is referred to herein as the count expression. For example, "(empno) FROM emp" is the count expression of the query "SELECT COUNT(empno) FROM emp". The count expression may include clauses that restrict the target data to less than all of the rows of a table. For example, the count expression "(empno) FROM emp WHERE name IS fred" will cause the database server to count how many non-null values are in the column "empno" of the rows in table "emp" that contain the name "fred".

COUNT STAR QUERIES

A special form of the count statement uses an asterisk (or star) as part of the count expression. Queries in the form "SELECT COUNT(*) . . ." are referred to herein as count star queries. Execution of a count star query produces a record that contains a count of all of the records in the specified target data, without regard to whether the records contain null values. For example, a user can submit the query SELECT COUNT(*) FROM emp;

to find out how many rows are in the table emp. The resultant value is a count of all rows in the specified table, without regard to whether the rows contain any null-values.

Every row in a table is identified by a unique identifier. The identifiers used to uniquely identify rows are referred to herein as "rowids". Because each row has its own rowid, the number of rowids associated with a table will equal the number of distinct rows in the table. Therefore, count star queries can be processed by counting the number of rowids in the table (or subset of a table) specified in the count expressions of the count star queries.

Fetching and counting the rowids of the rows in a table is much faster than fetching and evaluating values for a particular column from all rows of a table, as is required to process other types of count queries. This is due to the fact that the rowid is an "address" of a row, and the address of a row can be computed without fetching data from the row. In contrast, an address must be visited to find the values within the columns of the row. Consequently, it is faster to count addresses than to visit the addresses and fetch data from the addresses. Therefore, count star queries can be processed more efficiently than conventional count queries because no columns need to be fetched and evaluated.

COUNT QUERY TRANSFORMATION

According to an embodiment of the invention, a database server is provided that selectively transforms count queries to count star queries based on whether the target data specified in the count expression may contain null values. Specifically, the database server determines whether the count expression specifies a set of data that cannot contain nulls. If the count expression specifies a set of data that cannot contain nulls, the count query is transformed into a count star query. If the count expression specifies a set of data that may contain nulls, then the count query is not transformed into a count star query.

Various conditions may indicate to the database server that a particular set of data cannot contain nulls. For example, a table-level constraint may exist on the set of data that prohibits the set of data from containing nulls. For example, the count expression "(col1) FROM t1" specifies a set of data that does not contain nulls if a table-level constraint precludes the existence of null values in column col1 of table t1. Therefore, the count expression is transformed to (*) FROM t1.

In addition, the count query itself may limit the set of data specified in the count expression to non-null values. For example, an additional "WHERE column IS NOT NULL" clause on the count statement restricts the target data to rows that do not contain null values. Because the target data cannot possibly contain null values, there is no need to inspect each record in the target data to determine whether the target data within the record contains a null value.

After a count query is transformed to a count star query, the query is processed by the database server as if the query had been a count star query. Specifically, the query is processed by determining the number of rowids in the specified target data. For example, assume that a NOT NULL constraint exists on the column col1 of table t1. The query "SELECT COUNT(col1) FROM t1" would be transformed to "SELECT COUNT(*) FROM t1". The query would then be processed by counting the rowids of the rows in table t1. The actual data from column col1 would not have to be read or evaluated.

INDEX-BASED COUNT PROCESSING

Often, the data container that contains the target data will not be the only data container that stores the rowids of the rows of the table. For example, every index that is associated with a table also contains the rowids of the rows of the associated table. An index will contain the rowids of all of the rows of a table if the index is built on a non-null column of the table, or if the index includes null-values and is built on any column of the table.

According to one embodiment of the invention, count star queries are processed by first determining whether a data container, other than the data container that contains the actual target data, stores the rowids of all of the rows in the target data. If no other body of data stores the rowids of all of the rows in the target data, then the table that contains the target data is accessed to determine the number of rowids that are associated with the target data. However, if another body of data, such as an index associated with the table, stores the rowids of all of the rows that contain the target data, then the database server may fetch and count rowids from the other body of data.

This technique allows count star queries, including count queries that have been transformed to count star queries, to be processed using an arbitrary index on the table that contains the target data specified in the query. Because indexes are generally smaller than the table that contains the target data and have a higher likelihood of already being loaded into dynamic memory, fetching information from such bodies of data is much faster than fetching from the table itself.

Figure 2:
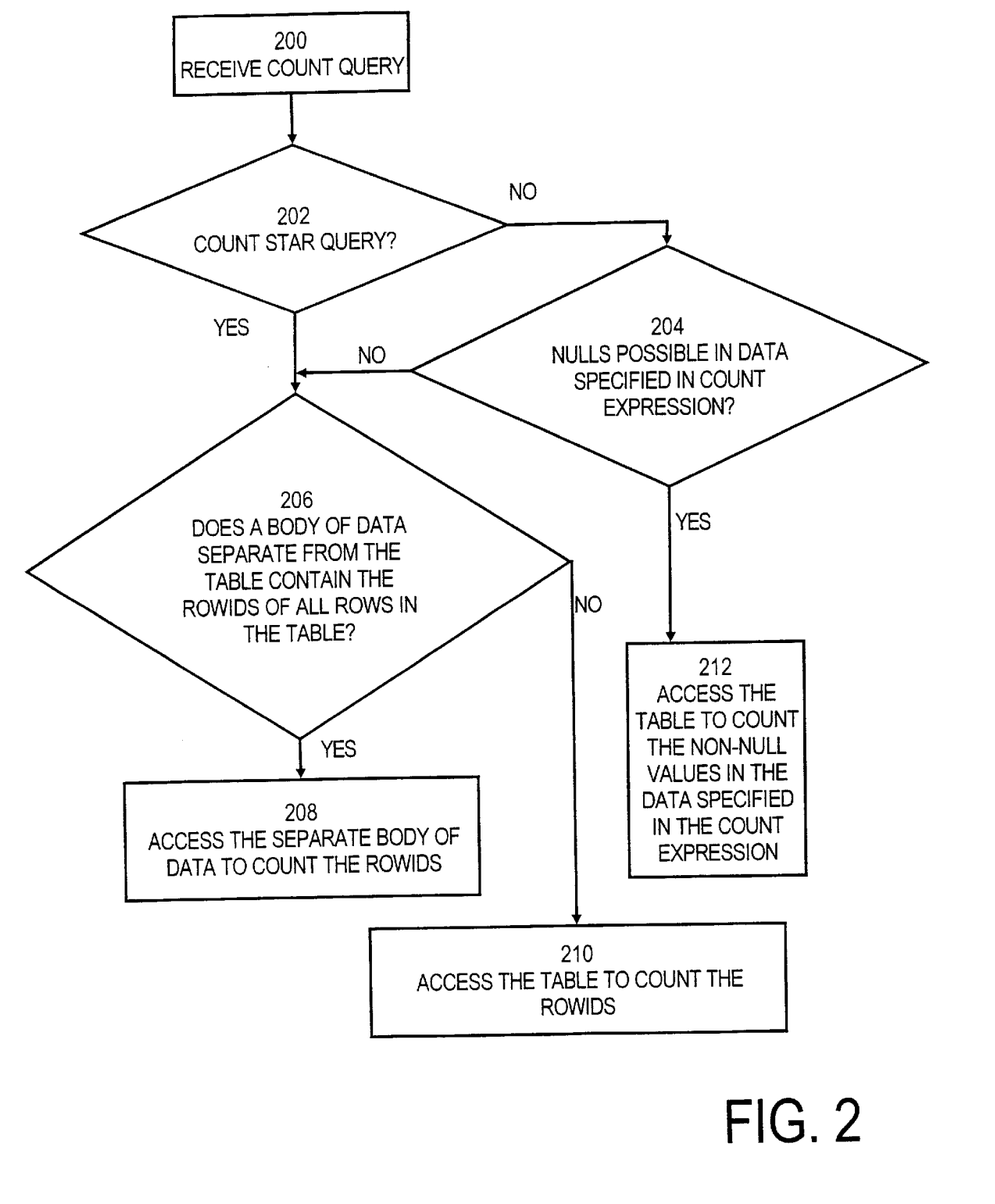
FIG. 2 is a flow chart illustrating steps of processing a count query according to an embodiment of the invention.

FIG. 2 is a flow chart that illustrates how a database server processes count queries according to an embodiment of the invention. At step 200, the database server receives the count query. At step 202, the database server determines whether the count query is a count star query. If the count query is a count star query, then control passes to step 206. Otherwise, control passes to step 204.

At step 204, the database server determines whether nulls are possible in the data specified in the count expression. This step may be performed, for example, by determining whether any NOT NULL constraint applies to a column specified in the count expression. Step 204 may alternatively or additionally involve determining whether any clause of the count expression restricts the target data to non-null values. If it is possible for the data specified in the count expression to contain nulls, then control passes to step 212. Otherwise, control passes to step 206.

At step 212, the non-null values in the column specified in the count expression are counted by accessing the appropriate table. The rows from the specified table are fetched into dynamic memory and data from the specified column is evaluated to determine whether it represents a null value. A count value is incremented for every fetched row in which the specified column does not contain a null value.

Step 212 may alternatively be implemented by accessing an index on the column being counted. Specifically, rather than accessing the table itself, an index on the appropriate column of the table may be accessed to count the non-null values in the data specified in the count expression. However, as long as the specified column is allowed to contain null values, indexes on other columns of the table cannot be used to perform the count.

At step 206, the database server determines whether a body of data that is separate from the table specified in the count expression contains rowids of all of the rows of the table specified in the count expression. Step 206 may involve, for example, determining whether any indexes exist that (1) have been built on a nonnull column of the table specified in the count expression, or (2) include entries for null values and have been built on any column of the table specified in the count expression. In either case, such indexes will contain a rowid for every row in the specified table.

If a separate body of data contains the rowids of all rows of the table specified in the count expression, then control passes to step 208. At step 208, the database server counts the rowids of the rows in the table specified in the count expression by fetching information from the separate body of data.

If a separate body of data does not contain the rowids of all of the rows of the table specified in the count expression, then control passes to step 210. At step 210, the database server counts the rowids of the rows in the table specified in the count expression by fetching information from the table itself.

BITMAP INDEXES

A bitmap index is an index that includes a set of bitmaps that can be used to efficiently process queries on a body of data associated with the bitmap index. In the context of bitmap indexes, a bitmap is a series of bits that indicate which of the records stored in the body of data satisfy a particular criteria. Each record in the body of data has a corresponding bit in each bitmap. Each bit in a bitmap serves as a flag to indicate whether the record that corresponds to the bit satisfies the criteria associated with the bitmap.

Typically, the criteria associated with a bitmap is whether the corresponding records contain a particular key value. In the bitmap for a given key value, all records that contain the key value will have their corresponding bits set to 1 while all other bits are set to 0. According to one embodiment, even records that contain a null value for the key associated with the index have a corresponding bit in each bitmap. A collection of bitmaps for the key values that occur in the data records can be used to index the data records. In order to retrieve the data records with a given key value, the bitmap for that key value is retrieved from the index and, for each bit set to 1 in the bitmap, the corresponding data record is retrieved. The records that correspond to bits are located based on a mapping function between bit positions and data records.

For example, assume that a table contains ten rows, where each row contains a name field and a gender indicator field.

Assume further that Rows 2, 3, 4, 5, 6, 8, 9 and 10 contain the gender indictor MALE, while rows 1 and 7 contain the gender indicator FEMALE. A bitmap index made on the gender indicator column would have to bitmaps, one for the key value MALE and one for the key value FEMALE.

Given the conditions described above, the bitmap of the table for the criteria "GENDER=MALE" would be 0111110111, where the "1"s in positions 2–6 and 8–10 indicate that the second through sixth and eighth through tenth rows of the table satisfy the "GENDER=MALE" criteria, and the zeros in the first and seventh positions indicate that first and seventh rows in the table do not satisfy the "GENDER=MALE" criteria.

When retrieving data using a bitmap index, several logical retrieval conditions may be combined using Boolean operations on the appropriate bitmaps. For example, if the data that is to be retrieved is subject to the conditions that key1=<val1>and key2=<val2>, a bitwise AND of the bitmaps for key values <val1> and <val2>can be performed to generate a bitmap that indicates the data items that match both conditions.

AGGREGATE FUNCTION PROCESSING USING BITMAP INDEXES

In some database systems, the bitmaps stored in bitmap indexes are stored in a compressed format. Database systems that use bitmap indexes typically include a bitmap-to-rowid converter that receives compressed bitmaps as input and generates a set of rowids as output, where the rowids identify the rows represented by the compressed bitmap that satisfy the criteria associated with the bitmap.

When a bitmap index is used to retrieve data specified in a query, the bitmap associated with the key value specified in the query is located and passed to the bitmap-to-rowid converter. The bitmap-to-rowid converter decompresses the bitmap and generates the actual rowids of the rows that correspond to the "1" bits in the compressed bitmap. The rowids are then used to retrieve the rows that satisfy the query.

To process queries that contain certain aggregate functions (e.g. count queries), the actual rowids of the rows that contain the target data are unimportant because the content of the rows is unimportant. Therefore, according to one embodiment of the invention, a database server is provided that includes a bitmap-to-count converter which, similar to the bitmap-to-rowid converter described above, receives as input compressed bitmaps. However, the bitmap-to-count converter does not fully decompress compressed bitmaps or produce a series of rowids. Rather, the bitmap-to-count converter merely counts the number of "1" bits represented in the compressed bitmap and returns the rowid count.

The bitmap-to-count converter described above is useful in processing other types of aggregate functions, such as SUM functions and AVERAGE functions. For example, the average of a set of values is computed by dividing the sum of the values by the number of values. A bitmap-to-count converter may be used to determine the count by which the sum of a set of values must be divided.

Figure 3:
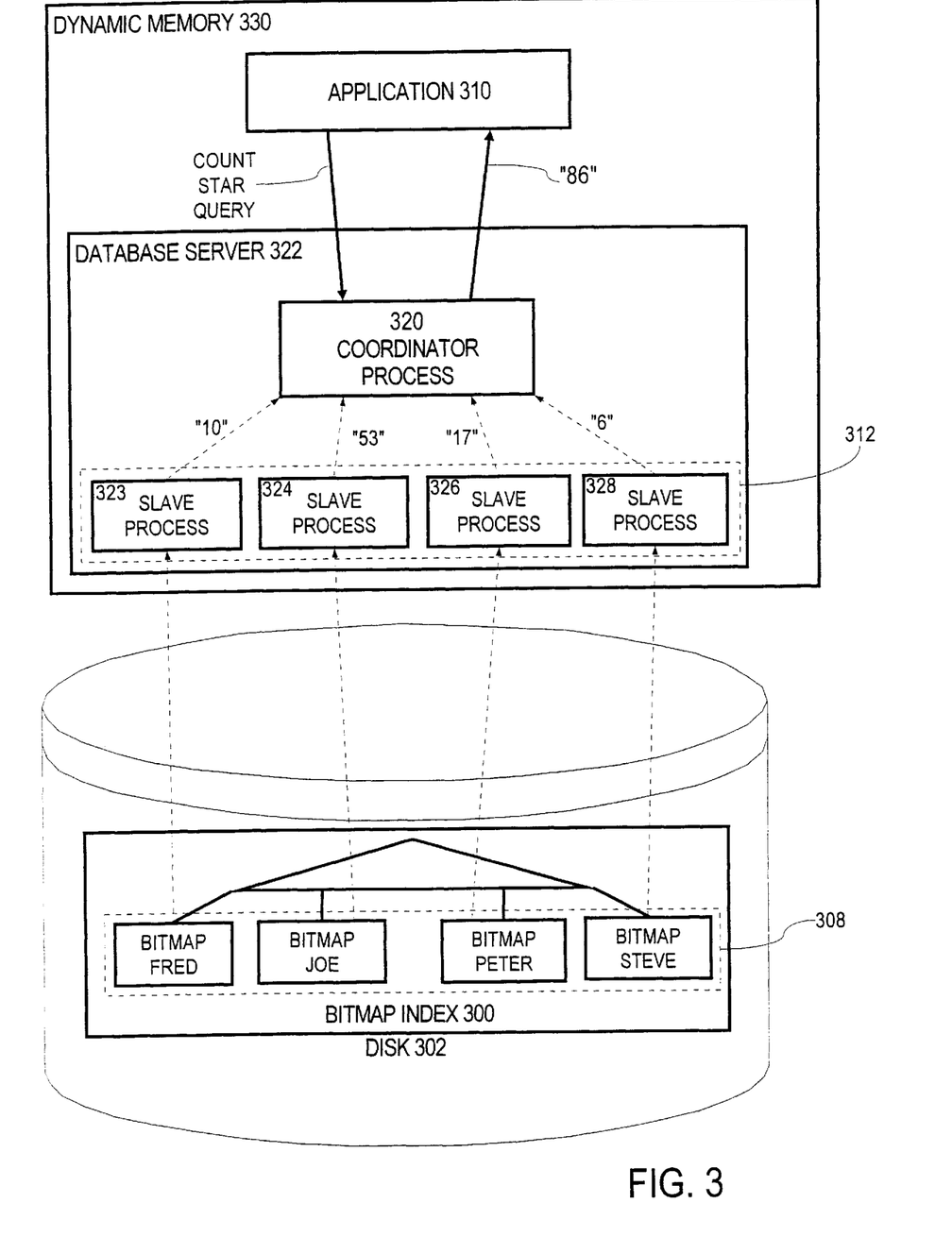
FIG. 3 is a block diagram of a database system that includes a bitmap-to-count converter according to an embodiment of the invention.

Often, the target data of a count query will include rows identified in multiple compressed bitmaps and/or multiple compressed segments of a single bitmap. According to one embodiment of the invention, when multiple compressed bit sequences are involved, the bitmap-to-count converter is used to produce intermediate aggregate results. The intermediate aggregate results are then combined to produce a final count value. The operations executed to perform the intermediate aggregation may be performed by a single process, or by multiple processes in parallel. FIG. 3 illustrates an embodiment in which intermediate aggregation is performed by multiple processes in parallel. However, the present invention is not limited to the parallel execution of intermediate aggregation.

Referring to FIG. 3, it illustrates a database system in which bitmap-to-count converters are used to process a count query in parallel according to an embodiment of the invention. The count query being processed in FIG. 3 is "SELECT COUNT (*) FROM t1 WHERE name = "fred" OR name = "peter" OR named "steve".

The database system includes dynamic memory 330 and persistent storage represented by disk 302. A database application 310 that is executing in dynamic memory 330 issues the count query to a database server 322 that is also executing in dynamic memory 330. For the purposes of illustration, the database application 310 and the database server 322 are illustrated residing in the same dynamic memory. However, they may alternatively be in different memories of the same computer system or in different memories of separate computer systems.

The database server 322 assigns the task of executing the count query to a coordinator process 320. The coordinator process 320 determines that a bitmap index 300 has been created on the "name" column of the table "t1", which is the target data of the count query. The coordinator process 320 traverses the bitmap index 300 based on the key values specified in the query to identify a set of compressed bitmap segments 308 that identify the rows that correspond to the target data of the count query.

In the illustrated example, the set of compressed bitmap segments 308 includes one bitmap for each of the four key values specified in the query. However, the bitmap for any given key value may itself be split into multiple compressed bitmap segments. Thus, even when a count query specifies a single key value, processing the query may still involve a plurality of compressed bitmap segments.

Coordinator process 320 assigns the task of processing the set of bitmap segments 308 to a set of processes 312, where each process is assigned the task of processing a distinct subset of the set of compressed bitmap segments 308. In the illustrated example, the set of processes 312 includes one process per bitmap segment to be processed.

Each of the processes 312 executes the bitmap-to-count converter on each of its assigned bitmap segments and combines the resulting count values to produce an intermediate aggregate value. In the illustrated embodiment, the processes 323, 324, 326 and 328 produce the intermediate aggregate values 10, 53, 17 and 6, respectively. The processes pass the intermediate aggregate values up to the coordinator process 320. The coordinator process 320 combines all of the intermediate count values to produce a single count value that is stored in a row that is passed back to the application 310 as the result of the count query.

By counting the rowids in each compressed bitmap segment rather than performing the complete decompression operations, and by summing the intermediate count values rather than having a single process count each rowid individually, the efficiency of processing count queries using bitmap indexes is significantly increased.

GROUP BY CLAUSES

An SQL SELECT statement containing grouping or aggregate functions like COUNT can use a GROUP BY clause to aggregate many values of one column based on the distinct values of a second column. For example, the following query will find the count of employees identified in the column "empno" for each department identified in the column "deptno":

SELECT COUNT(empno), deptno FROM emp GROUP BY deptno;

In response to this query, the database server must return a single row for each distinct deptno, with each row containing the distinct deptno value and the count of employees in the rows that have that value.

COUNT STAR QUERIES WITH GROUP BY CLAUSES

Figure 4:
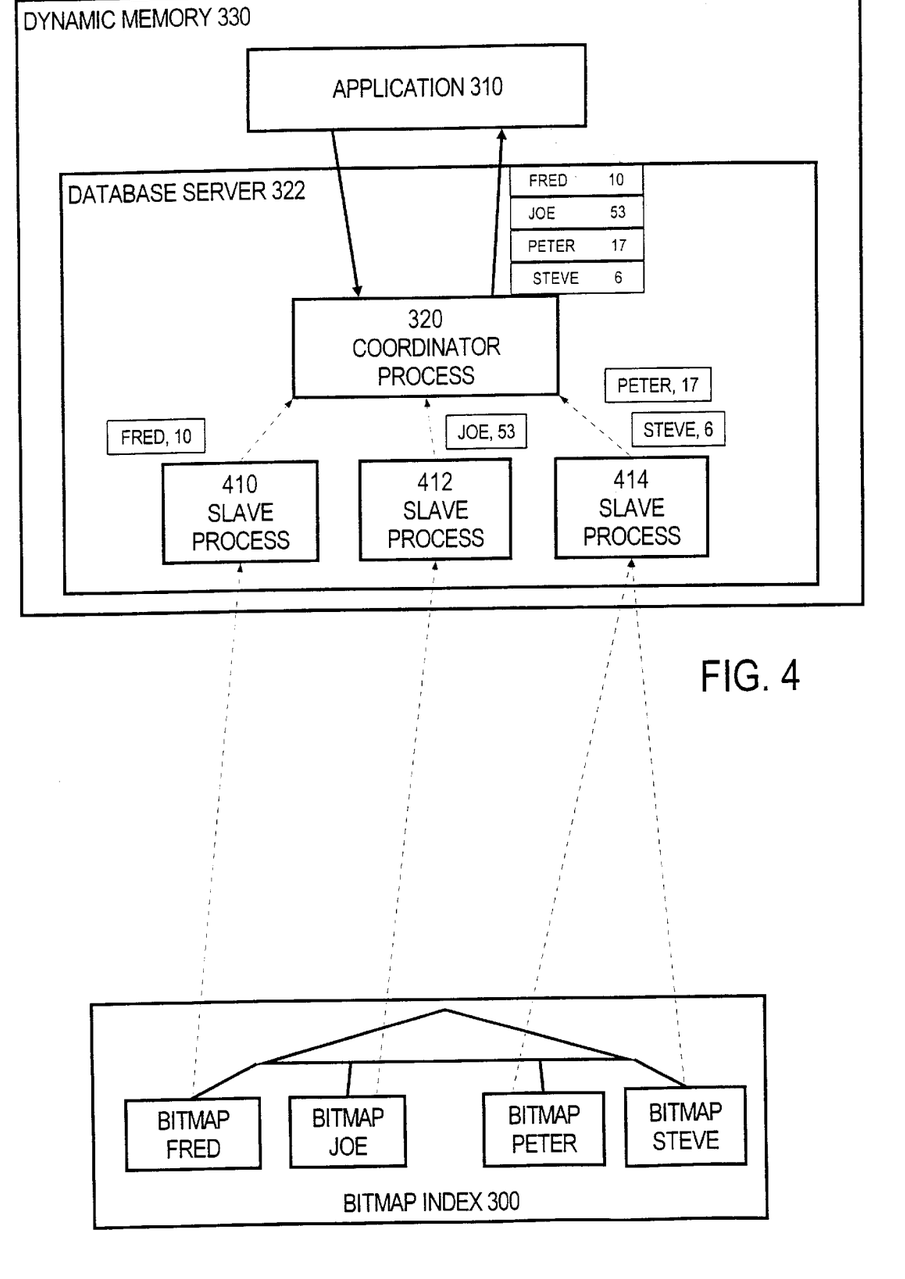
FIG. 4 is a block diagram of a database system performing a count star query with a group by clause according to an embodiment of the invention.

According to one embodiment of the invention, the bitmap-to-count converter is used to generate a plurality of count values based on a specified grouping. Referring to FIG. 4, assume that application 310 submits the statement "SELECT COUNT(*), name FROM emp GROUP BY name;". The database server 322 assigns the task of executing this query to coordinator process 320.

Coordinator process 320 traverses the bitmap index 300 that is associated with the column "name" to find the compressed bitmaps associated with each of the distinct name values. For the purposes of explanation, it shall be assumed that "fred", "joe", "peter" and "steve" are the four distinct values in the column "name" in table "emp". The coordinator process 320 then assigns a set of slave processes 410, 412 and 414 the task of processing the compressed bitmaps.

Each of slave processes 410, 412 and 414 generates intermediate results that include one count for every distinct value of "name" in the compressed bitmap segments that it was assigned. The segregation of counts for each value does not require any significant overhead because of the correspondence between key values and bitmaps. For example, slave process 414 has been assigned the bitmaps associated with the values "peter" and "steve". Slave process 414 merely counts the number of "1"s in the bitmap for peter to generate an intermediate count for the value "peter", and counts the number of "1"s in the bitmap for "steve" to generate an intermediate count for the value "steve".

The "GROUP BY" clause indicates to the slave processes that they are not to combine the count values for distinct key values. Rather, the slave processes pass back to the coordinator process one count value for each distinct key value that they encounter. In the illustrated embodiment, slave process 410 would pass back a count for the value "fred", slave process 412 would pass back a count for the value "joe", and slave process 414 would pass back one count for the value "peter" and a separate count for the process "steve".

The coordinator process 320 receives these intermediate count values and sums any intermediate count values that are associated with the same key value. The coordinator process 320 then passes back to the application 310 one row for each distinct key value, where each row contains the count value for the key value associated with the row.

In the explanation given above, slave processes are used to generate intermediate count values in parallel. However, the intermediate values may alternatively be generated serially by a single process. Further, it is possible to have another second slave set between the coordinator and the slave set described above. The second slave set may be responsible for aggregating each distinct key (group by key) fully, and then pass it to the coordinator. Using this technique, the final aggregation operation is divided among multiple processes.

NON-RELATIONAL DATABASE SYSTEMS

Various embodiments of the present invention have been described above with reference to relational database systems in which data is stored in rows within tables. However, the present invention is not limited to any particular type of database system. For example, in object oriented database systems, object classes, object instances and object attributes are equivalent to tables, rows and columns, respectively.

Each object instance has a unique object identifier (OID) just as each row in a table has a unique rowid. Bitmap indexes may be used to index the object instances of an object class in the same manner as they are used to index the rows of a table. Therefore, the techniques described herein are applicable to count queries regardless of the structure of the data containers (e.g. tables, object classes) used by the database system, the structure of the records within the data containers (e.g. rows, object instances), and the structure of the fields within the records (e.g. columns, attributes).

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing count queries in a database system that includes a data container having a plurality of records, the method comprising the steps of:

receiving a count query that specifies target data within said data container;

determining, without evaluating the target data, whether the target data can possibly include null values;

if the target data cannot possibly include null values, then, without evaluating the target data, processing the count query by determining how many records in the data container contain the target data; and if the target data can possibly include null values, then processing the count query by determining how many records in the data container contain non-null values for the target data by reading and evaluating the target data.

2. The method of claim 1 further comprising the step of, if the target data cannot possibly include null values, then transforming the count query into a count star query and executing the count star query.

3. The method of claim 1 wherein, if the target data cannot possibly include null values, then the step of processing said count query includes the steps of:

determining whether an index exists that is associated with said data container and that contains identifiers for said plurality of records;

if an index exists that is associated with said data container and that contains identifiers for said plurality of records, then determining how many records in the data container contain the target data based on the identifiers stored in said index; and if an index does not exist that is associated with said data container and that contains identifiers for said plurality of records, then determining how many records in the data container contain the target data based on identifiers stored in said data container.

4. The method of claim 3 wherein:

a bitmap index exists that is associated with said data container and that contains identifiers for said plurality of records; and the step of determining how many records in the data container contain the target data based on identifiers stored in said index includes the step of counting how many bits are set in one or more bitmaps contained in said bitmap index.

5. The method of claim 4 wherein the step of counting how many bits are set in one or more bitmaps comprises the steps of:

assigning to each of a plurality of processes a task of counting how many bits are set in a subset of said one or more bitmaps;

causing each of said plurality of processes to generate an intermediate count based on said subset of said one or more bitmaps; and summing the intermediate counts generated by said plurality of processes to generate a total count value.

6. The method of claim 5 wherein:

the count query includes a group by clause;

the step of causing each of said plurality of processes to generate an intermediate count based on said subset of said one or more bitmaps includes causing each of said plurality of processes to generate a separate intermediate count for each distinct key value associated with said subset of said one or more bitmaps; and the step of summing the intermediate counts includes separately summing the intermediate counts for each of the key values associated with said one or more bitmaps to generate a total count for each of said key values.

7. A method for processing a count query in a database system, the method comprising the steps of:

determining that the count query specifies target data that cannot include null values;

transforming the count query to a count star query; and executing the count star query without reading and evaluating the target data.

8. The method of claim 7 wherein the step of executing the count star query includes the step of determining how many records in a data container contain the target data.

9. The method of claim 8 wherein:

a bitmap index exists that is associated with said data container and that contains identifiers for the records in the data container; and the step of determining how many records in the data container contain the target data includes the step of counting how many bits are set in one or more bitmaps contained in said bitmap index.

10. The method of claim 9 wherein the step of counting how many bits are set in one or more bitmaps comprises the steps of:

assigning to each of a plurality of processes a task of counting how many bits are set in a subset of said one or more bitmaps;

causing each of said plurality of processes to generate an intermediate count based on said subset of said one or more bitmaps; and summing the intermediate counts generated by said plurality of processes to generate a total count value.

11. The method of claim 10 wherein:

the count query includes a group by clause;

the step of causing each of said plurality of processes to generate an intermediate count based on said subset of said one or more bitmaps includes causing each of said plurality of processes to generate a separate intermediate count for each distinct key value associated with said subset of said one or more bitmaps; and the step of summing the intermediate counts includes separately summing the intermediate counts for each of the key values associated with said one or more bitmaps to generate a total count for each of said key/values.

12. The method of claim 7 wherein the step of executing the count star query without reading and evaluating the target data includes the step of counting record identifiers from an index associated with a data container that contains the target data.

13. The method of claim 7 wherein the step of executing the count star query without reading and evaluating the target data includes the step of counting how many bits are set to a particular value in one or more bitmaps in a bitmap index associated with a data container that contains the target data.

14. The method of claim 13 wherein the step of counting how many bits are set to a particular value in one or more bitmaps includes the steps of:

assigning said one or more bitmaps to a plurality of processes, wherein each of said plurality of processes is assigned a subset of said one or more bitmaps;

causing each process of said plurality of processes to generate an intermediate value based on a subset of said one or more bitmaps; and summing intermediate values generated by said plurality of processes.

15. A method for processing a count star query in a database system, the method comprising the steps of:

identifying a bitmap index associated with a data container, said data container containing target data specified in said count star query; and counting how many bits are set to a particular value in one or more bitmaps in said bitmap index without generating record identifiers based on said one or more bitmaps.

16. The method of claim 15 wherein the step of counting how many bits are set to a particular value includes the steps of:

assigning said one or more bitmaps to a plurality of processes, wherein each of said plurality of processes is assigned a subset of said one or more bitmaps;

causing each process of said plurality of processes to generate an intermediate value based on a subset of said one or more bitmaps; and summing intermediate values generated by said plurality of processes.

17. The method of claim 15 wherein:

the count star query includes a group by clause;

the step of counting how many bits are set to a particular value includes the steps of:

assigning said one or more bitmaps to a plurality of processes, wherein each of said plurality of processes is assigned a subset of said one or more bitmaps;

causing each process of said plurality of processes to generate one intermediate value for each distinct key value in said subset of said one or more bitmaps; and summing the intermediate values for each distinct key value to produce a single count value for each distinct key value associated with said one or more bitmaps.

18. A computer-readable medium having stored thereon sequences of instructions for processing count queries in a database system that includes a data container having a plurality of records, the sequences of instructions including sequences of instructions which, when executed by a processor, cause said processor to perform the steps of:

receiving a count query that specifies target data within said data container;

determining, without evaluating the target data, whether the target data can possibly include null values;

if the target data cannot possibly include null values, then, without evaluating the target data, processing the count query by determining how many records in the data container contain the target data; and     if the target data can possibly include null values, then processing the count query by determining how many records in the data container contain non-null values for the target data by reading and evaluating the target data.

19. The computer-readable medium of claim 18 further comprising sequences of instructions form performing the step of, if the target data cannot possibly include null values, then transforming the count query into a count star query and executing the count star query.

20. The computer-readable medium of claim 18 wherein, if the target data cannot possibly include null values, then the step of processing said count query includes the steps of:

determining whether an index exists that is associated with said data container and that contains identifiers for said plurality of records;

if an index exists that is associated with said data container and that contains identifiers for said plurality of records, then determining how many records in the data container contain the target data based on the identifiers stored in said index; and     if an index does not exist that is associated with said data container and that contains identifiers for said plurality of records, then determining how many records in the data container contain the target data based on identifiers stored in said data container.

\* \* \* \* \*